United States Patent [19]
Pekar

[11] Patent Number: 5,647,078
[45] Date of Patent: Jul. 15, 1997

[54] CONTROL PANEL FOR AN INFLATABLE STRUCTURE

[75] Inventor: Robert W. Pekar, Florence, Mass.

[73] Assignee: Dielectrics Industries, Chicopee, Mass.

[21] Appl. No.: 449,898

[22] Filed: May 23, 1995

[51] Int. Cl.$^6$ .......................... A47C 27/08; A47C 27/10
[52] U.S. Cl. ................... 5/706; 5/710; 5/655.3; 5/932
[58] Field of Search .................. 5/453, 455, 456, 5/457, 933, 449

[56] References Cited

U.S. PATENT DOCUMENTS

| | | | |
|---|---|---|---|
| 1,772,310 | 8/1930 | Hart | 5/453 |
| 2,998,817 | 9/1961 | Armstrong | 5/453 |
| 3,192,540 | 7/1965 | Swank | 5/456 |
| 4,852,195 | 8/1989 | Schulman | 5/453 |
| 4,864,671 | 9/1989 | Evans | 5/455 |
| 5,022,109 | 6/1991 | Pekar | 5/457 |

*Primary Examiner*—Steven N. Meyers
*Assistant Examiner*—Robert G. Santos
*Attorney, Agent, or Firm*—McCormick, Paulding & Huber

[57] ABSTRACT

A control panel for an inflatable structure includes a multi-layer planar fluid flow control panel sealed together at predetermined locations to define at least one fluid flow conduit with at least one layer of the panel having a plurality of apertures located in a predetermined pattern that communicate with the conduits. A plurality of discrete, inflatable chambers are sealed in planar orientation to the upper surface of the control panel to form the structure. The apertures of the panel are sealed in registered relationship with the fluid orifices to thereby permit fluid communication between the chambers and conduits of the control panel for selective inflation and deflation thereof. The interior surface of the control panel and chambers is selectively coated with a release material to prevent closure of the conduits and enable coplanar sealing of the chambers onto the panel about the perimeter of the apertures and orifices when disposed in registered relation.

16 Claims, 4 Drawing Sheets

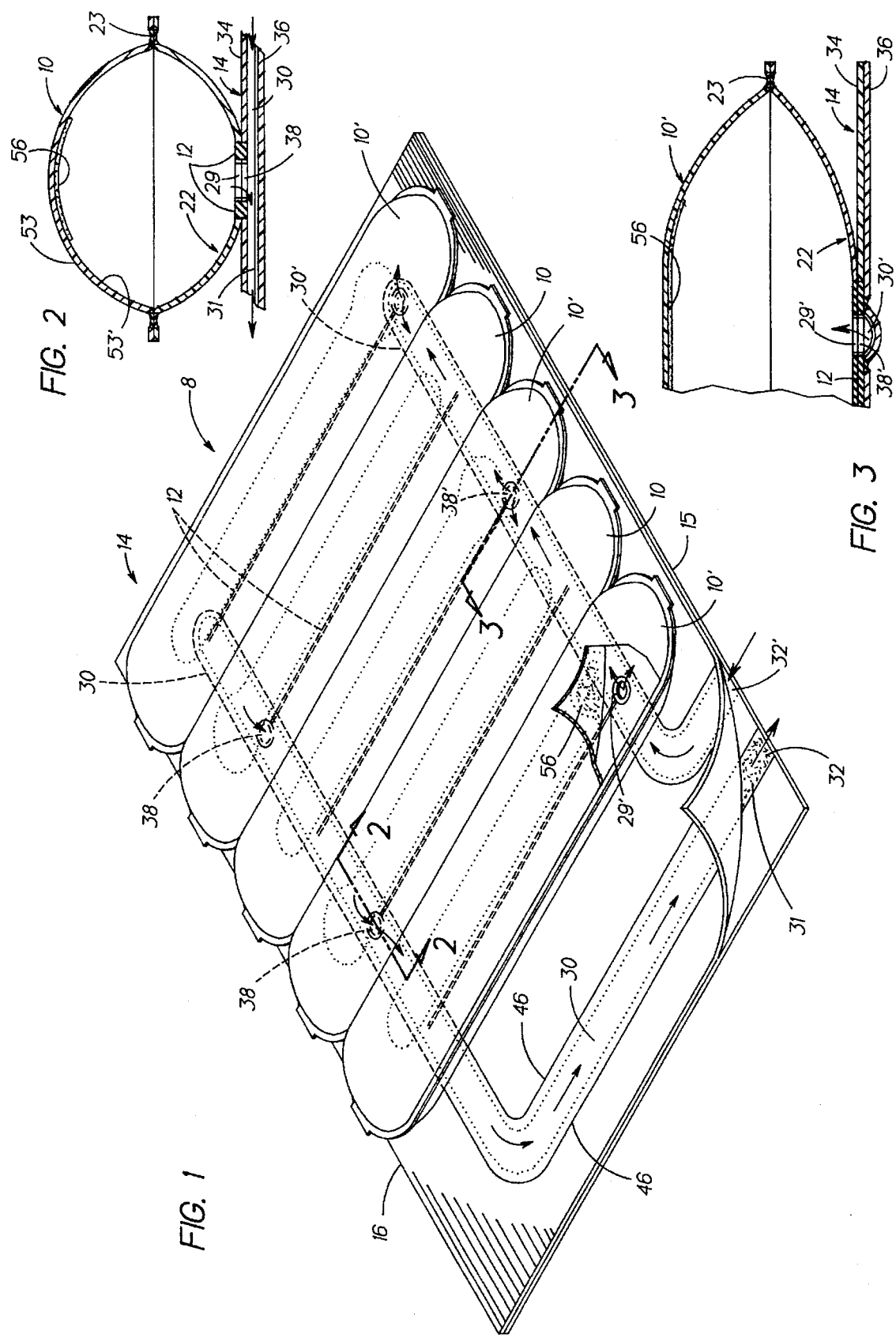

CONTROL PANEL FOR AN INFLATABLE STRUCTURE

FIELD OF THE INVENTION

This invention relates to body support structures and, more particularly, to multi-laminar mattresses, cushions, and lumbar support systems composed of a plurality of discrete chambers sealed to a fluid flow control panel which provides fluid flow conduits for selective inflation of the chambers.

BACKGROUND OF THE INVENTION

Many inflatable mattresses and cushions are used to provide added comfort and support to individuals who are in a sitting or supine position for a prolonged period of time. Some of these mattresses and cushions are adapted to be placed upon a hospital bed or upon wheelchair seats to reduce the likelihood of developing bedsores.

Inflatable air mattresses adapted to prevent bedsores are disclosed by Chamberland in U.S. Pat. No. 4,896,389 and Afeyan in U.S. Pat. No. 4,914,771. Each mattress is formed of two sheets of plastic material comprising of a plurality of elongated pillows adjacent to and parallel to each other which are formed by folding the upper sheet and a base portion having two air distribution channels or plenums disposed along the full length of both sides of the mattress. The ends of the pillows communicate with the plenums. A pumping means provides air flow to the plenums via a tubular hose to inflate all pillows of the mattress to a constant uniform pressure.

It is known in the art to use inflatable mattresses or sheets having separate zones of pillows which can be independently pressurized to reduce the likelihood of developing bedsores. Each zone is alternately inflated and depressurized to vary the load upon the portion of the person's body in contact with the mattress. At present, such mattresses generally employ a number of discrete tubular hoses and fittings connected to each of the pillows to be alternately inflated and deflated. This construction, however, is cumbersome to use and difficult and time consuming to manufacture.

An inflatable sheet disclosed by Grant in U.S. Pat. No. 5,263,211 is another example of the use of independent zones of cells that are alternately inflated and deflated. The inflatable sheet comprises two sheets of plastic material sealed together to form two independent sets of interdigitated fluid cells. The arrangement of the cells and the dimensions thereof are limited because the cells act as both the cushioning means and the conduit to supply air to the cells.

SUMMARY OF THE INVENTION

It is the principal object of this invention to provide an inflatable multi-laminar structure with an economical means for selective inflation of the chambers of the structure.

It is another object of this invention to provide an inflatable multi-laminar structure constructed to enable the chambers that form the structure to be inflated in various sequences, patterns or configurations.

According to the present invention, a unitary fluid flow control panel of a generally planar, multi-laminar construction is composed of synthetic plastic layers sealed together at predetermined locations to provide for a plurality of predetermined fluid flow conduits for connection to a variable pressure source for the fluid, at least one layer of the panel also being provided with a predetermined pattern of apertures therethrough to provide fluid communication with at least one of the conduits. The panel has sealed thereto in generally coplanar relationship, an inflatable structure including a plurality of fluid orifices adapted to be disposed in registered relation with the apertures. A release material is selectively disposed in a preselected pattern on an interior surface of the panel to provide conduit paths and to prevent sealing of the interior surfaces of the conduits when sealing of the inflatable structure onto the panel.

The above and other objects and advantages of this invention will become more readily apparent when the following description is read in conjunction with the accompanying drawings.

BRIEF DESCRIPTION OF THE DRAWINGS

FIG. 1 is a perspective view of a cushion in an inflated condition of the type which embodies the present invention;

FIG. 2 is a cross-sectional view taken along line 2—2 of the cushion of FIG. 1;

FIG. 3 is a cross-sectional view taken along line 3—3 of the cushion of FIG. 1;

DETAILED DESCRIPTION OF THE PREFERRED EMBODIMENT

Figure 4:
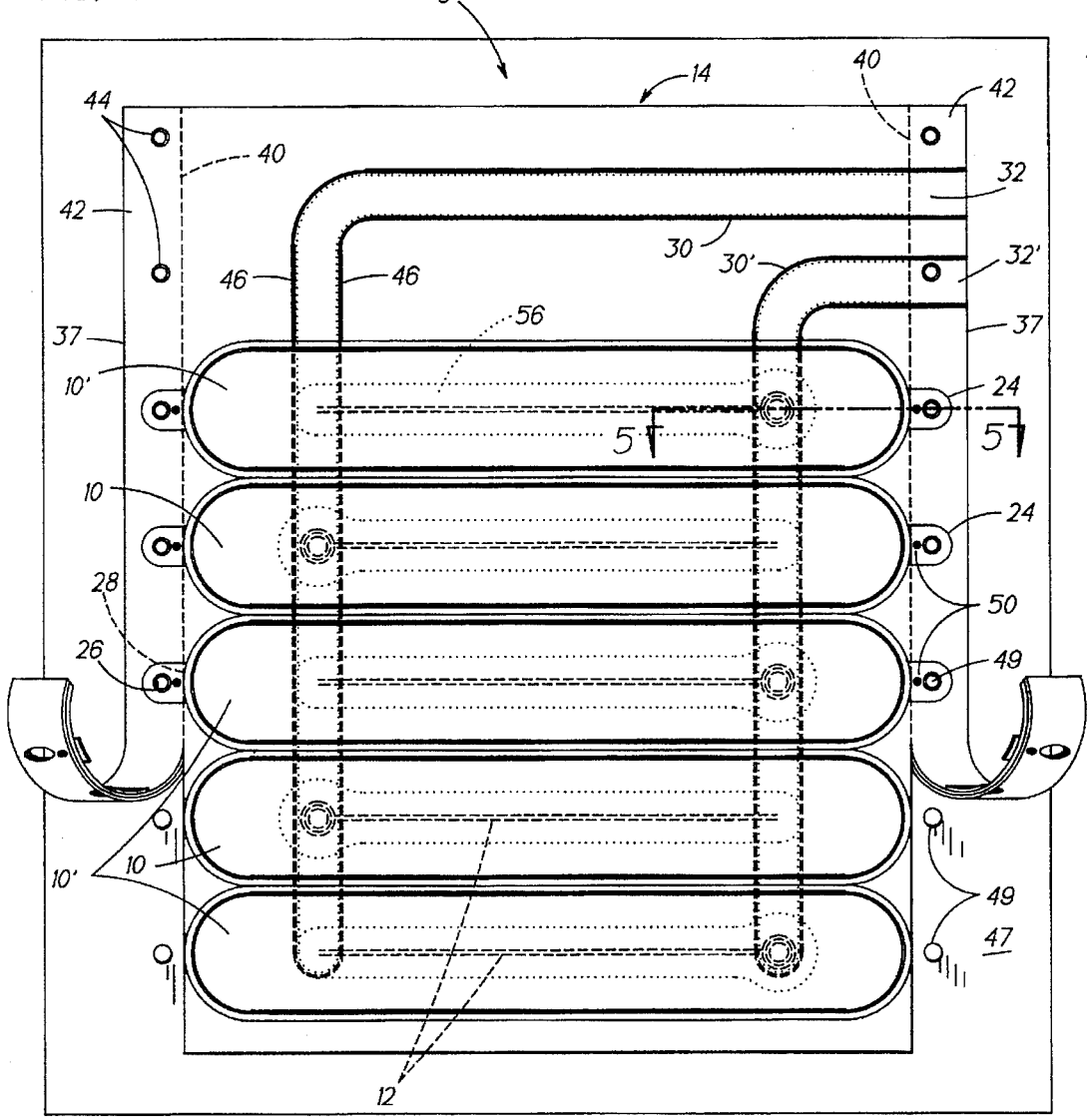
FIG. 4 is a top plan view of the cushion of FIG. 1 during a step in the manufacture thereof.

An inflatable cushion 8 of the type embodying the invention is illustrated in FIG. 1 and formed entirely of flexible thermoplastic material, such as polyurethane, polyvinyl chloride, or the like. As shown, the cushion 8 comprises a plurality of discrete, contiguous and parallel chambers 10 and 10' secured at 12 to a preformed planar fluid flow control panel 14.

The control panel 14, as shown, generally includes two independent conduits 30 and 30' adapted for alternately inflating and deflating the inflatable chambers 10 and 10' sealed thereto. Each of the conduits 30 and 30' extend longitudinally along the control panel 14 generally parallel to opposite side edges 15 and 16 thereof. A pumping means (not shown), adapted to alternately provide fluid under pressure to one of the conduits 30 and 30' while substantially simultaneously exhausting the fluid from the other of the two conduits 30 and 30'. Thereafter, in a predetermined time sequence, the cycle would be reversed so that if the first cycle involved supplying high pressure fluid to conduit 30' while exhausting the fluid by connection of conduit 30 to a vacuum source, in the next cycle, conduit 30 would be connected to the high pressure side of the pump and conduit 30' to the vacuum side thereof. Referring to FIGS. 2 and 3, the conduits 30 and 30' are in fluid communication with the chambers 10 and 10' through apertures 38 and 38' disposed in the upper sheet 34 of the control panel 14 and a fluid orifice 29 and 29' disposed through the lower wall portion 22 of each chamber. The chambers 10 and 10' are sealed to the control panel 14 such that the orifices and apertures are sealed in registered relation to each other to provide the means for fluid communication therebetween. The apertures 38 and 38' are disposed in the control panel 14 in a predetermined pattern (see FIG. 6) such that the each conduit 30 and 30' communicates with every other chamber. The features of this embodiment will hereinafter be referenced by their generic number.

No matter the complexity of the number and locations of the fluid conduits 30 and apertures 38 required to communicate with the chambers, the control panel 14 may be easily changed by simply varying its sealing pattern. The flow control panel 14 allows for the chambers 10 to be disposed in a variety of arrangements or patterns on the control panel 14 with a plurality of conduits 30 disposed therein to provide a simple, cost effective means to selectively interconnect predetermined groups of chambers.

Figure 5:
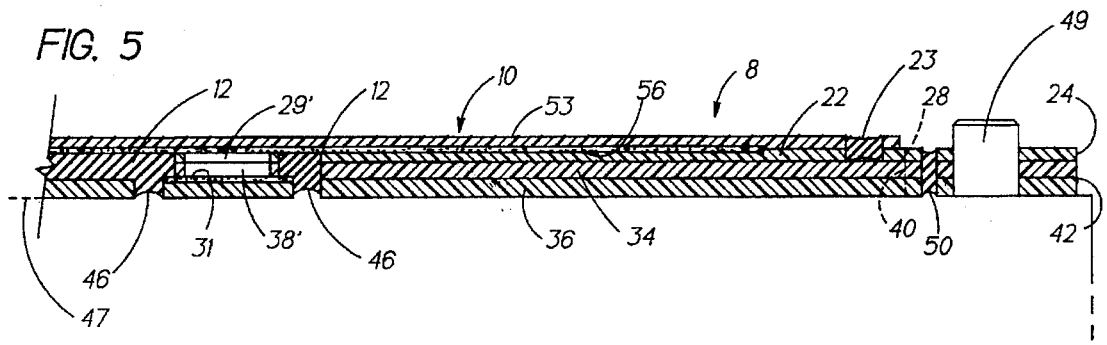
FIG. 5 is a cross-sectional view taken along line 5—5 of the cushion of FIG. 4.
Figure 6:
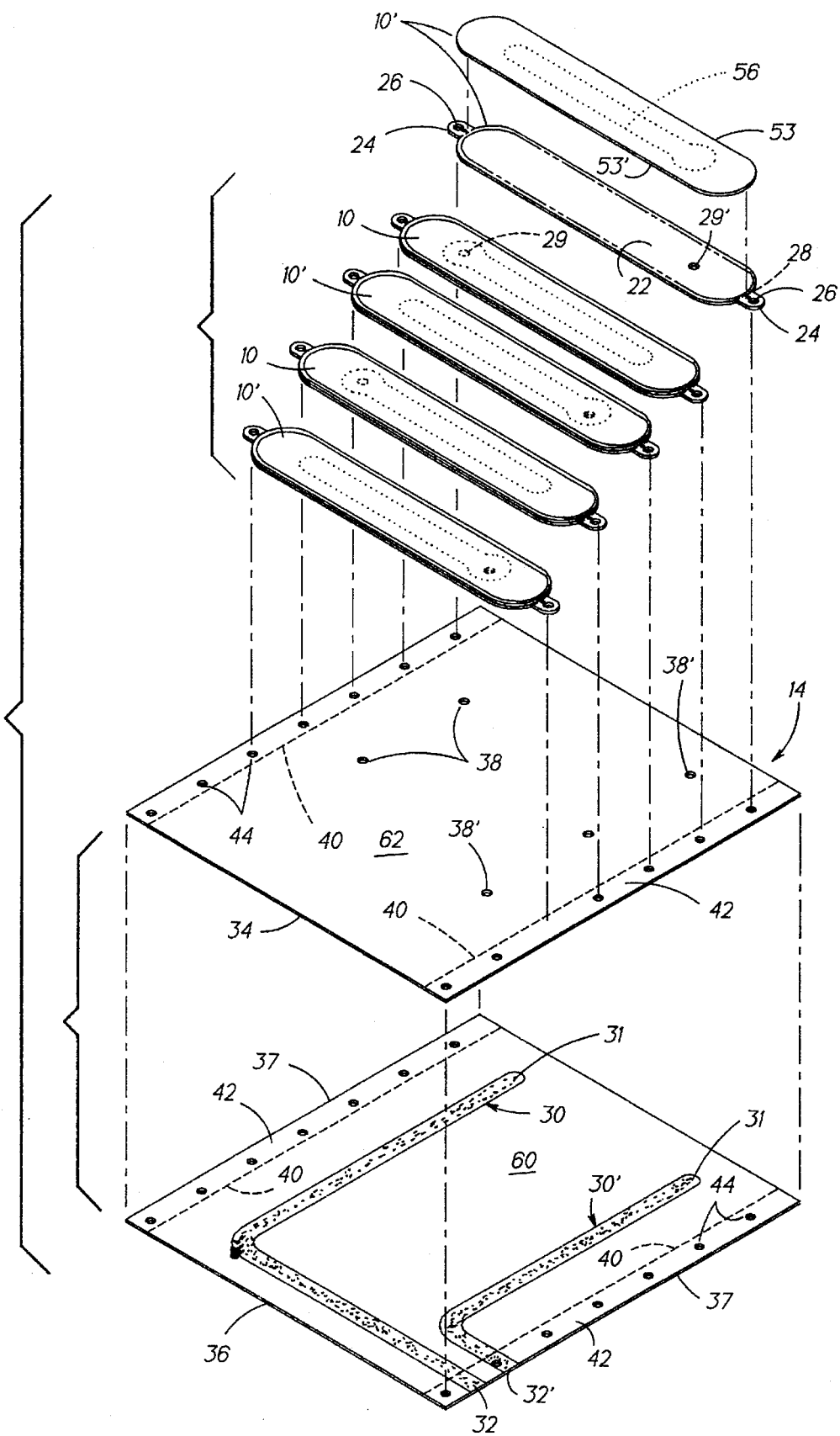
FIG. 6 is an exploded perspective view, illustrative of the method of manufacture of the cushion of FIG. 1.

Another important aspect of this invention, as best illustrated in FIG. 5, is that the cushion 8 is assembled as a planar structure to thereby reduce the time and cost to fabricate the cushion. Referring to FIG. 6, this, in part, is accomplished by coating the inner surface 53' of the chambers 10 with a release or barrier material 56 to prevent the inner surfaces thereof from sealing together when the preformed chambers are sealed to the preformed control panel 14. In addition, the inner surface 60 of layer 36 is coated with release material 31, as shown in FIG. 6, to prevent the sealing together of the opposed surfaces of layers 34 and 36 when the chambers 10 are sealed to the upper surface 62 of layer 34 of the flow control panel.

The preformed, inflatable chambers 10, as shown in FIG. 6, may be formed by a lower sheet 22 and an upper sheet 53 sealed together about their peripheral edges to form, when inflated, a generally elongated fluid chamber of oval cross-section (FIG. 2). The inner surface 53' of the upper layers is coated with a barrier material 56. Each chamber 10 has at least one fluid orifice 29 disposed at a predetermined position in the lower portion 22 of the chamber to provide fluid intercommunication between the chamber 10 and a conduit 30 of the flow control panel 14. Mounting tabs 24 (FIGS. 4 and 6) extend outwardly at opposite ends of the lower layer 22 of the chambers with eyelets 26 disposed therein for temporarily securing the chambers in place to the flow control panel 14 during the sealing and assembly process, to be described hereinafter. A perforation or score line 28 disposed between the tab 24 and the lower layer 22 of the chamber 10 provide easy removal of the tab once the chamber is permanently sealed to the flow control panel 14.

The flow control panel 14 provides a planar surface for securing the chambers 10 thereto and in fixed contiguous relation to each other while providing fluid distribution conduits 30 of planar configuration, except when actually in use to inflate the chambers, between an inflation opening or valve means 32 and the chambers.

In the preferred embodiment shown in FIGS. 5 and 6, the flow control panel 14 comprises an upper sheet 34 and lower sheet 36 of thermoplastic material, in stacked edge-to-edge relationship and sealed together with release material 31 therebetween to define a plurality of independent conduits 30 which may be arranged in any predetermined pattern for interconnection of various groups of chambers 10. It should be recognized by one skilled in the art that the control panel 14 may be formed of a single, folded sheet of material.

The inner surface 60 of the lower sheet 36 of the flow control panel 14 is coated with a release material 31 over the area that will define the conduits 30 to prevent the inner surfaces of the conduits from sealing or adhering together so as to not block or limit fluid flow therethrough. The release material 31 prevents sealing of the inner surfaces of the conduits when the chambers 10 are sealed to the outer surface 62 of the upper sheet 34 of the flow control panel 14 at 12. In addition, the release material overcomes the tendency of the inner surfaces of the sheet material 34 and 36 from blocking or adhering together when the control panel is deflated for long periods of time. In the alternative, the inner surface of the conduits 30 may simply be coated at locations within the conduits disposed below the seal 12.

The upper sheet 34 of the control panel 14 has a plurality of fluid communication apertures 38 disposed along the conduits 30 in a predetermined pattern. The chambers 10 are sealed to the control panel 14 about the orifices 29 which are disposed in registered relationship to the apertures 38. The apertures 38 are arranged such that each independent conduit 30 communicates with every other chamber 10, as best shown in FIGS. 1 and 4, and which allows for the two independent groups of chambers to be inflated at different pressures and/or at different times. Moreover, as heretofore described, the two groups of chambers 10 and 10' may be alternately inflated and deflated using a pumping means (not shown) connected to the inflation openings or valve 32 and 32'.

The flow control panel 14 also includes perforation or score lines 40, (FIGS. 4, 5 and 6) adapted to be readily separated, that longitudinally extend along opposite side edges 37 thereof to define two registration strips 42. In the embodiment shown in FIG. 4, a plurality of equi-spaced eyelets 44 are longitudinally disposed along the length of each strip. The longitudinal distance between the eyelets 44 determine the position or lateral spacing between adjacent chambers.

Referring to FIG. 4, the eylets 44 of the control panel 14 and the eyelets 26 of the mounting tabs 24 of the chambers 10 are adapted to engage a plurality of registration posts or pins 49 extend from a planar surface 47 to temporarily secure and properly position the chambers 10 and the flow control panel 14 in coplanar relationship during assembly thereof.

Referring to FIG. 6, one method of manufacturing the cushion 8 depicted in FIG. 1 is to independently prefabricate the chambers 10 and flow control panel 14 and then, simply assemble the preformed chambers and flow control panel together, as a coplanar structure, to form the operable cushion 8. To fabricate the flow control panel 14, both the upper and lower sheets 34 and 36 of thermoplastic material may be perforated or scored to define the registration strips 42 that longitudinally extend along the opposing sides 37. The eyelets 44 disposed therein are cut or punched out. The apertures 38 in the upper sheet 34 are then cut or punched out in a predetermined pattern. The inner surface 60 of the lower sheet 36 is coated with a release material 31, as described hereinafter, over the area that defines the conduits. The sheets 34 and 36 are then stacked in edge-to-edge relationship and sealed around the edges 46 (FIGS. 4 and 5) of the conduits 30 using RF energy. In the alternative, the sheets of the control panel 14 may be laminated together by heat-sealing the entire panel whereby the sheets seal together except for the areas coated with release material 31 to thereby form the conduits 30. Heat-sealing the entire panel 14 allows for the conduits 30 to be rerouted by simply changing the pattern of the release material.

Each of the chambers 10 are formed by preferably die-cutting each layer of sheet material to the desired shape. It should be recognized by one skilled in the art that the chambers may be of any shape, such as circular, oval, elliptical or polygonal, without departing from this invention. The lower portion 22 of each chamber includes a fluid communication orifice 29 and mounting tabs 24 which are separated from the chamber 10 by perforation or score lines 28.

The release material, as discussed above, may be applied, such as disclosed in my earlier U.S. Pat. No. 5,022,109, by conventional printing techniques, such as silk screening, rotogravure or flexographic process. Preferably, the coatings are applied as a composition in a liquid dispersion medium of an organic solvent or water base with a dispersed phase of freely divided microscopic particles of a polyethylene, a polytetrafluoroethylene (Teflon) or silicone on the order of five microns in diameter. With the release material firmly bonded to the sheets, the polyethylene, Teflon or silicone particles thereof will inhibit the sealing of the coated areas in the abutted portions of the two sheets engaged by the sealing dies.

After the control panel 14 and chambers 10 have been formed, the control panel is then fitted upon a flat planar surface 47 that has a plurality of registration pins 49 of sufficient height to extend through the eyelets of the registration strips 42 and the eyelets in the tabs 24. In this way, the chambers 10 will be positioned accurately on the outer surface 62 of the upper layer 34 of the flow control panel 14. Each tab 24 may then be spot-sealed to the registration strip 42 at 50, as shown in FIGS. 4 and 5 between the eyelet 26 and the perforations 28. After sealing the chambers 10 to the control panel as shown at 12 of the drawings, they are then permanently secured to the flow control panel 14 with the fluid orifices 29 of the chambers 10 disposed and registered in sealed relation with the fluid apertures 38 of the fluid control panel.

After such sealing operation, the registration strips 42 may be readily removed from the assembly by tearing along the perforated lines 40 and the superimposed score lines 28 of the mounting tabs 24.

Figure 7:
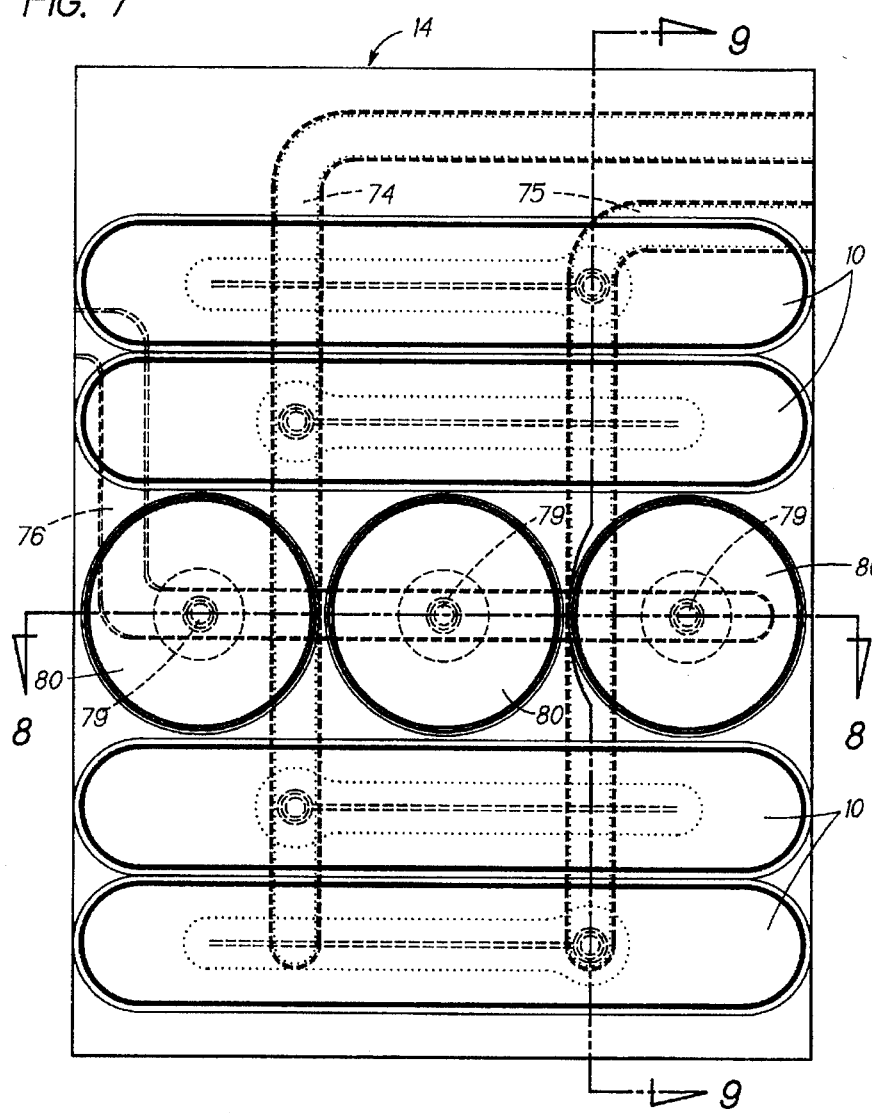
FIG. 7 is a top plan view of an alternative embodiment of the cushion of FIG. 1.
Figure 9:
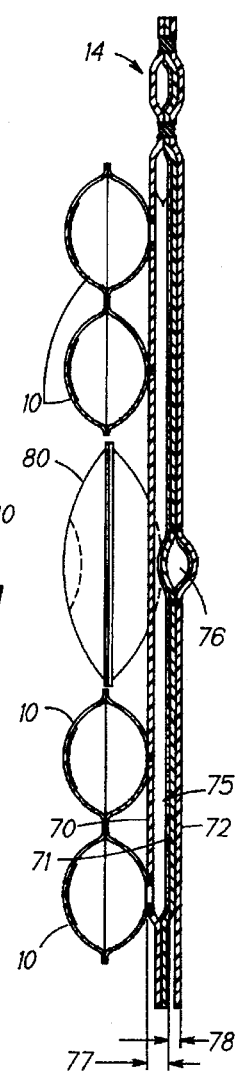
FIG. 9 is a cross-sectional view taken along line 9—9 of the cushion of FIG. 7.
Figure 8:
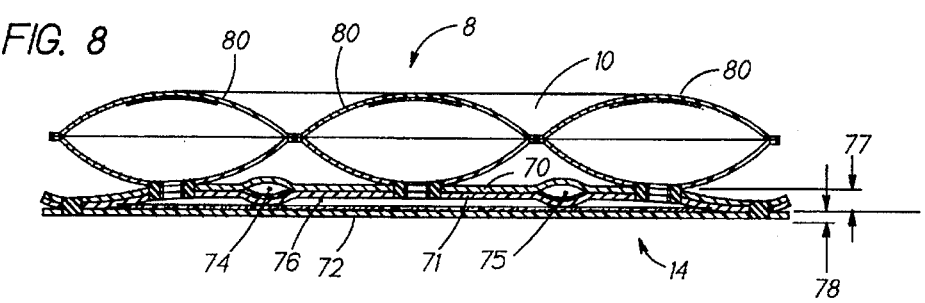
FIG. 8 is a cross-sectional view taken along line 8—8 of the cushion of FIG. 7.

Referring to an alternative embodiment of the control panel 14, is shown in FIGS. 7–9 and comprises a plurality of elongated chambers 10 and generally circular chambers 80 sealed to the control panel.

The control panel 14 may comprise three or more layers or sheets of thermoplastic material sealed in stacked edge-to-edge relationship to form a plurality of tiers 77 and 78 which provide conduits therebetween. This embodiment comprises three sheets 70, 71, and 72 sealed together to form an upper tier 77 and lower tier 78, as best shown in FIGS. 8 and 9. The upper and intermediate sheets 70 and 71 form the upper tier and provides conduits 74 and 75 therebetween. The intermediate sheet 71 and lower sheet 72 form the lower tier 78 and provide conduit 76 therebetween. Conduit 76 laterally traverses conduits 74 and 75 which longitudinally extend along the sides of the control panel 14. The conduit 76 extends transversely across the panel 14 intermediate the ends of the longitudinal conduits 74 and 75. The lower conduit 76 communicates with the chambers 80 via apertures 79 disposed in the upper and intermediate sheets 70 and 71 to provide fluid communication between the conduit 76 and chambers 80.

Although the fluid flow control panel 14 provides fluid communication to the chambers 10 of an inflatable body support structure, it should be apparent to one skilled in the art that the flow control panel be used to inflate a plurality of chambers or bellows sealed thereto to selectively actuate or manipulate valves or switches for various control applications.

Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described my invention, what is claimed is:

1. A fluid flow control panel adapted to be sealably assembled with a discrete inflatable structure having a plurality of orifices disposed and oriented at predetermined locations, said control panel comprising a multi-layer coplanar unitary panel having at least three layers sealed together at predetermined locations for defining at least two fluid distribution tiers, each tier providing at least one fluid flow conduit to thereby enable said fluid flow conduits in different tiers to traverse one another without communicating therebetween, said fluid flow conduits adapted for connection to a variable fluid pressure source, at least one layer of said panel being provided with a predetermined pattern of apertures therethrough, each of said apertures communicating with at least one of said conduits, said apertures being disposed and oriented for attachment to the inflatable structure, said control panel including a release material selectively disposed on an interior surface thereof to prevent closure of said conduits.

2. The combination comprising an inflatable structure having a plurality of inflatable chambers, a fluid flow control panel sealed in coplanar orientation to said inflatable structure and having at least three layers sealed together at predetermined locations for defining at least two fluid distribution tiers, at least some of said chambers including at least one fluid orifice for selective inflation and deflation thereof, each tier providing at least one fluid flow conduit to thereby enable conduits in different tiers to traverse without communicating therebetween, said fluid flow conduits adapted for connection to a variable fluid pressure source, at least one layer of said panel being provided with a predetermined pattern of apertures therethrough, each of said apertures communicating with at least one of said conduits, said fluid orifices being disposed in registered relation with said apertures, said panel having a release material selectively disposed on an interior surface thereof to enable coplanar sealing of said chambers onto said panel.

3. A fluid flow control panel, as set forth in claim 1, wherein a substantial portion of said fluid flow conduits are disposed for attachment below the inflatable structure.

4. The combination, as set forth in claim 2, wherein a substantial portion of said conduits are disposed below said inflatable chambers.

5. The combination comprising an inflatable structure having a plurality of inflatable chambers, and a fluid flow control panel sealed in coplanar orientation to said inflatable structure, at least some of said chambers including at least one fluid orifice for selective inflation and deflation thereof, said panel sealed together at predetermined locations for defining at least one fluid flow conduit for connection to a variable fluid pressure source, a substantial portion of said fluid flow conduit being disposed below said inflatable chambers, at least one layer of said panel being provided with a predetermined pattern of apertures therethrough, each of said apertures communicating with at least one conduit, said fluid orifices being disposed in registered relation with said apertures, said panel being provided with a release material selectively disposed on an interior surface thereof to enable coplanar sealing of said chambers onto said panel.

6. The combination, as set forth in claim 5, in which said release material is selectively disposed on an interior surface of said inflatable structure.

7. The combination, as set forth in claim 5, in which said release material is disposed on an interior surface of said fluid flow conduit.

8. The combination, as set forth in claim 5, in which said chambers are elongated and laterally disposed along said fluid flow control panel in parallel relation to each other.

9. The combination, as set forth in claim 8, in which said two independent fluid flow conduits longitudinally extend along said fluid flow control panel perpendicular to said chambers.

10. The combination, as set forth in claim 9, in which each chamber alternately interconnects between one of said fluid flow conduits via said orifices and apertures.

11. The combination, as set forth in claim 5, wherein said fluid flow conduit has a plurality of apertures.

12. The combination comprising an inflatable structure defined by at least four layers, said inflatable structure having a plurality of inflatable chambers, and a fluid flow control panel sealed in coplanar orientation to said inflatable structure, at least some of said chambers including at least one fluid orifice for selective inflation and deflation thereof, said panel sealed together at predetermined locations for defining at least one fluid flow conduit for connection to a variable fluid pressure source, at least one layer of said panel being provided with a predetermined pattern of apertures therethrough, each of said apertures communicating with at least one conduit, said fluid orifices being disposed in registered relation with said apertures, said panel being provided with a release material selectively disposed on an interior surface thereof to enable coplanar sealing of said chambers onto said panel.

13. The combination, as set forth in claim 12, in which said chambers are elongated and laterally disposed along said fluid flow control panel in parallel relation to each other.

14. The combination, as set forth in claim 12, in which said two independent fluid flow conduits longitudinally extend along said fluid flow control panel perpendicular to said chambers.

15. The combination, as set forth in claim 14, in which said each chamber alternately interconnects between one of said fluid flow conduits via said orifices and apertures.

16. The combination, as set forth in claim 12, wherein said fluid flow conduit has a plurality of apertures.

* * * * *